Patented July 13, 1937

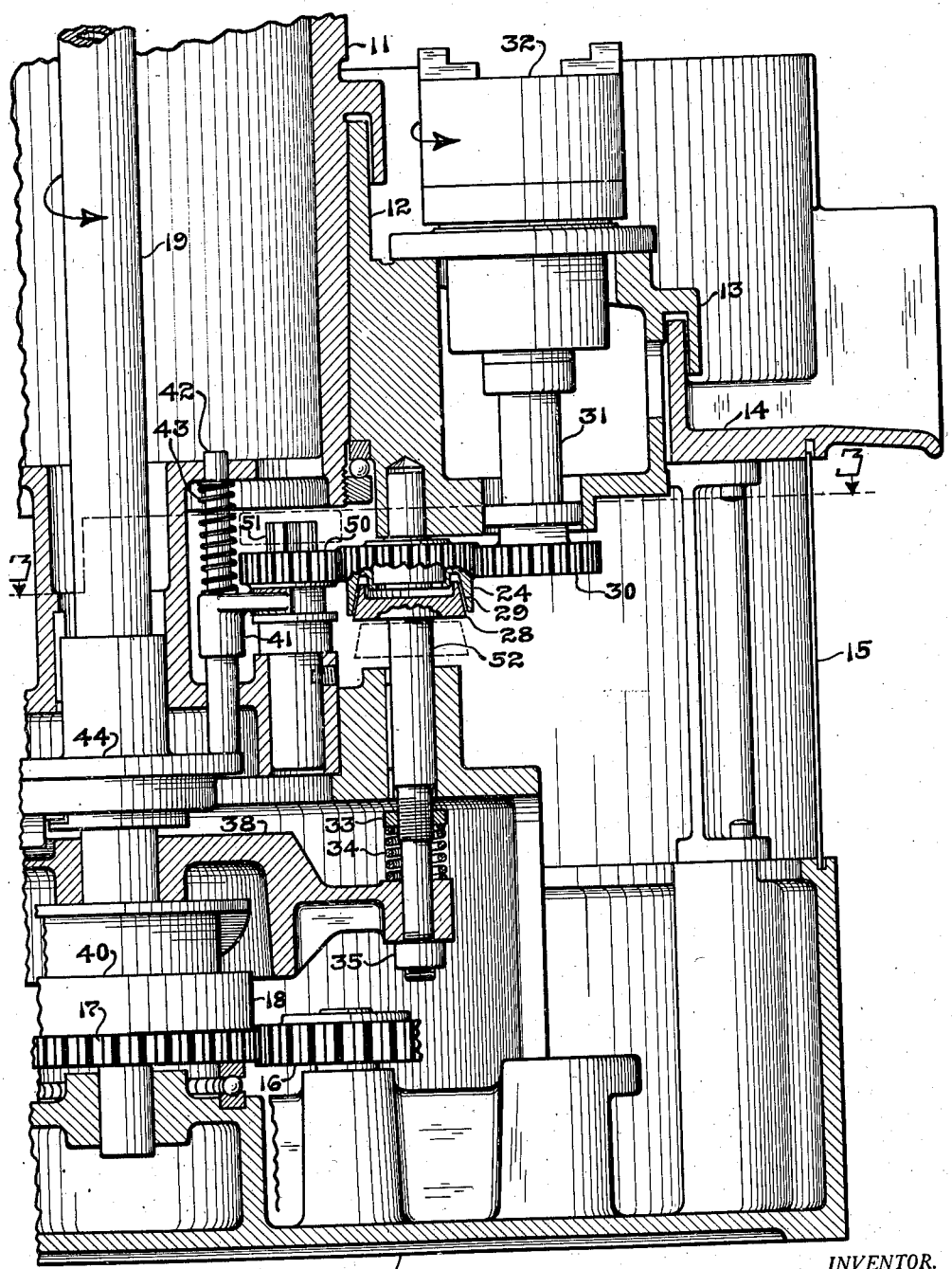

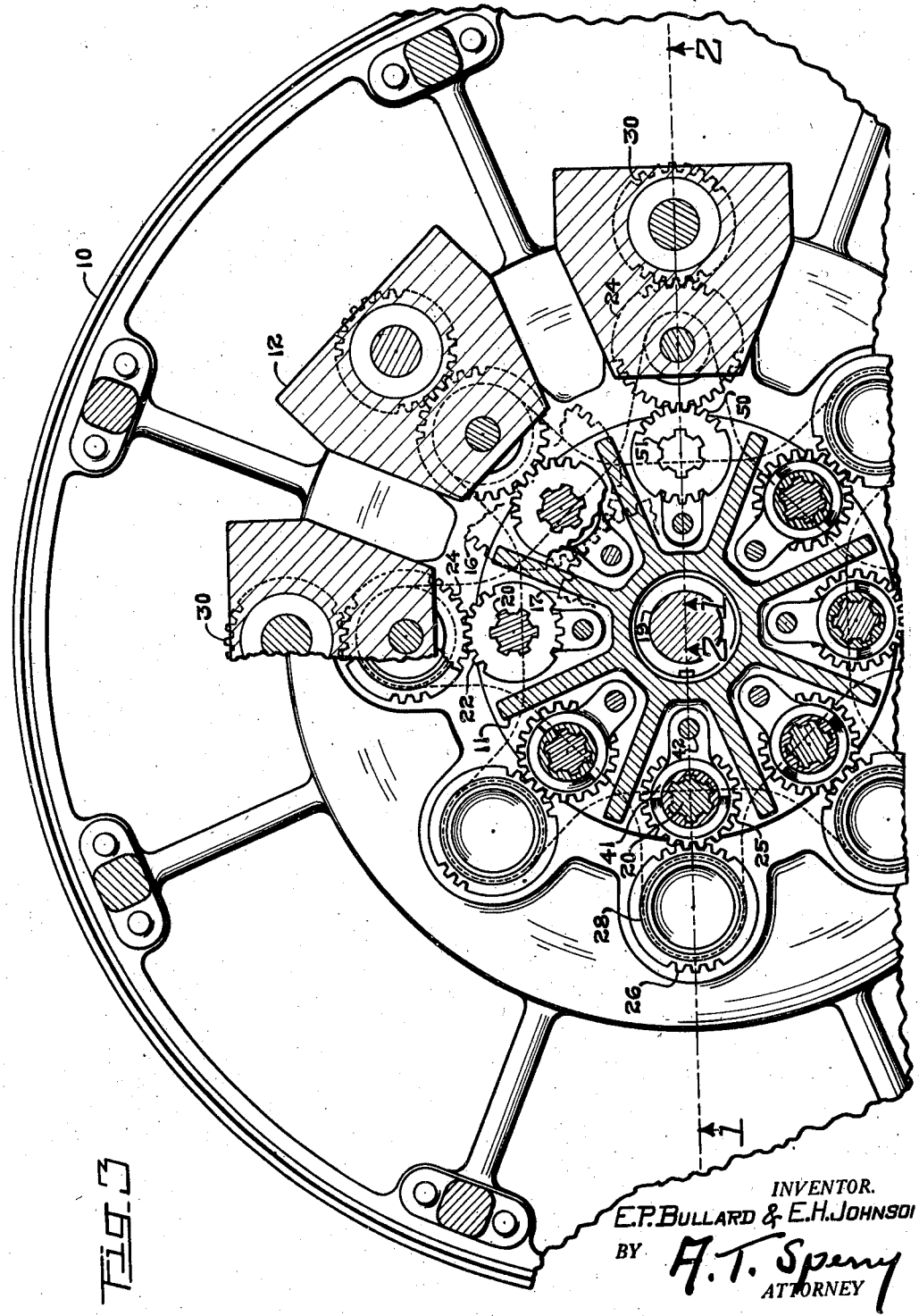

2,086,847

UNITED STATES PATENT OFFICE 2,086,847

MACHINE TOOL SPINDLE MECHANISM

Edward P. Bullard, Fairfield, and Ernest H. Johnson, Bridgeport, Conn., assignors to The Bullard Company, a corporation of Connecticut Application March 2, 1935, Serial No. 9,094

34 Claims. (Cl. 29—38)

The mechanism in the present invention is, as a whole, intended for, and illustrated as, a mechanism particularly adapted for multiple spindle, station type, machine tools. Such devices are characterized by a spindle carrier adapted to be indexed to periodically bring each spindle successively to individual working stations and to a loading station. At the latter, finished work may be removed from and new work placed upon the spindles while the working stations are operating on work pieces carried by other spindles. However, certain features of the invention will be seen to be applicable to single spindle machine tools, or multiple spindle machine tools in which the spindle carrier is adapted for continuous movement rather than as here shown. The inventive concept is, therefore, understood not to be confined to the specific embodiment here presented.

In such machines, considerable difficulty has been experienced in providing an ease of establishing a new driving connection for the spindles as they reach each successive working position. Difficulty has also been experienced in applying the driving power for the spindles without shock to the driving train and the consequent strain and damage to the mechanism; and further difficulties have been experienced in providing adequate means for effectively and efficiently restraining a spindle against rotation at the loading station so as to provide for the chucking and unchucking of a work piece.

Broadly speaking, it is among the objects of the invention to provide means for avoiding the above difficulties.

More specifically it is among the objects of the invention to provide a spindle drive mechanism by which a spindle may be engaged with the driving train without gear clashing or the danger of mutilated gear teeth, or time losses, due to improper mating of parts.

Another object is to provide a synchronizing mechanism by which power may be applied to the spindle without starting shock strains, noise and consequent deterioration.

Another object is to provide a combined and co-acting frictional and positive drive for the spindles by which the spindles may be initiated in their rotation through friction means and thereafter connected for positive drive.

Another object is to provide a mechanism for controlling the driving means automatically and in synchronism with the carrier movement.

Another object is to provide an improved brake mechanism for the spindle at the loading station; the same to be arranged to frictionally restrain the spindle rotation so as to facilitate chuck jaw and work manipulation.

Another object is to provide a positive spindle locking means at the loading station to secure the spindle thereof against accidental rotation after having been brought to rest by the brake.

Another general object is to provide an assembly and cooperation of elements automatically functioning to insure proper timed sequence of operation whereby the whole, by simple co-ordination, may carry out the foregoing desiderata.

Other objects, features and advantages of the mechanism will be apparent from consideration of the accompanying drawings in which:

Figure 2 is a similar section through the right hand side of the machine showing the mechanism for the loading station; and Figure 3 is a horizontal sectional view taken on the dotted lines 3—3 of Figures 1 and 2.

Figure 1:
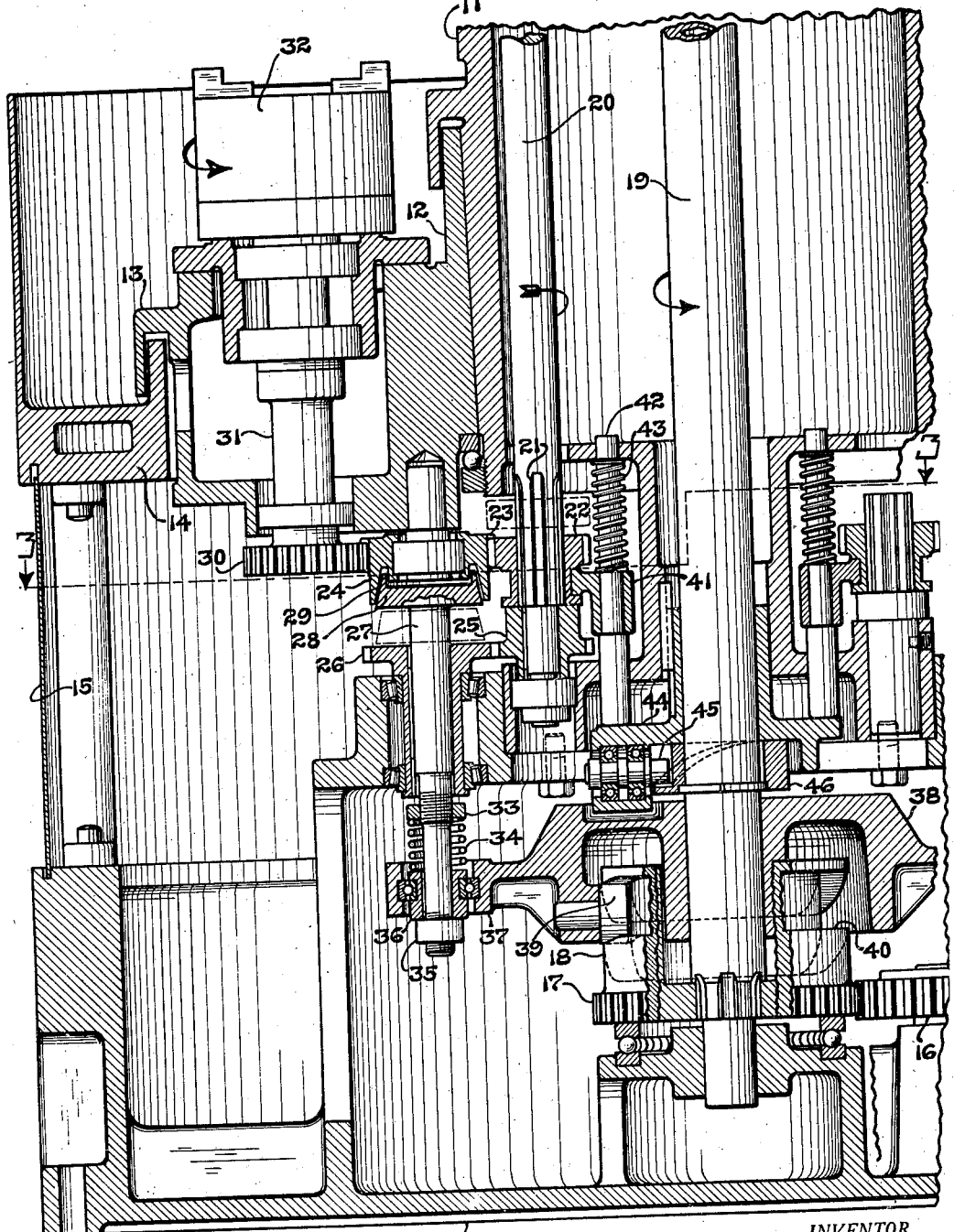
Figure 1 is a vertical sectional view of the left hand side of a machine tool embodying the invention and illustrating the drive for the spindle at a working station.

Broadly speaking, the invention provides a synchronizing drive mechanism between the spindles themselves and spindle driving members, one of which is mounted at each working station. The mechanism includes elements carried by the spindle carrier, one for each spindle, and cooperating instrumentalities permanently fixed in conjunction with each individual driving member. The spindle element comprises a gear having a friction clutch surface. The fixed instrumentalities include a clutch member adapted to engage the clutch surface referred to and a sliding gear adapted to mesh with and positively drive the spindle element. Both the clutch and the sliding gear are adapted to be driven by the spindle driving member and to be actuated in synchronism with an indexing mechanism for the spindle carrier; the arrangement being such that when the spindle first arrives at its working station, the sliding shaft is moved to engage the clutch and thus causing a friction drive for the spindle and, thereafter, when adequate spindle speed is secured through such frictional drive, the sliding gear is lowered into enmeshment to establish and, thereafter, maintain positive drive for the spindle. A similar mechanism is provided at the loading station except that the sliding gear is splined to a fixed shaft and there is no drive permitted for the clutch; thus, at this station, the spindle is arrested frictionally against possible residual rotary movement and, thereafter, positively locked against rotation through gearing enmeshment. Obviously, the structural embodiment here presented may be widely varied, various types of clutches may be substituted and the driving train may be greatly varied, as may the operating organization, without departing from the spirit or scope of the invention.

Referring more particularly to the drawings, the base of the machine shown to illustrate the invention is indicated by the numeral 10. Rising centrally from the base is a fixed column 11, which is adapted to house power shaft, controllers, and the like, and upon which may be mounted tool heads and feed works therefor not shown. The column 11 further provides a bearing surface for the annular spindle carrier 12, the outer lip 13 of which overlaps an external rim 14 of the base; the sides of the base being preferably enclosed by slidable doors 15 which permit access to the mechanism within the base.

Suitable mechanism, not shown in detail, is provided for periodically indexing the carrier to a degree measured by the number of spindles in the carrier. By reference to Figure 3, it will be seen that the form of the invention here shown is an eight spindle machine and the indexing of the spindle carrier therefor would normally be 45° of a complete revolution, so that at each indexing a spindle is moved from one station to the next. Obviously, however, the mechanism permits of double indexing, thus to move the spindle two stations at every index. Since the indexing mechanism forms no part of the present invention, it is deemed sufficient to here indicate a gear 16, which is adapted to drive a suitable index mechanism, such as a Geneva arm, or the like. Gear 16 is adapted to be driven from gear teeth 17 mounted upon a center cam member 18, which is periodically rotated, at the time of indexing, from a center indexing shaft 19 extending up through the column 11. Suitable control means, not shown, are provided for periodically actuating the shaft 19 in synchronism with other instrumentalities of the machine; the general arrangement being such that this drive is established at the termination of the working operations of the various stations. This general theory of operation is, in this respect, similar to the mechanism of Patents 1,258,089 and 1,360,175.

For rotating the spindles at their working station so that the work may be rotated against suitable tools, which are moved preferably in synchronism with the spindle rotation, fixed shafts 20, mounted within the column, are provided, one for each working station. These shafts are driven either continuously or intermittently from suitable mechanism, preferably in the feed works and preferably in timed relation with the movement of their associated tool head. The lower ends of the shafts 20 are splined, as at 21, and slidably over these splines for rotation with the shafts are mounted sliding gears 22, which, in their upper positions, are out of enmeshment with other mechanism, but which, in their lower positions, are in the plane of teeth 23 of synchronizing clutch gears 24; one of which is provided for each spindle and is carried with the spindle in the carrier. The shafts 20 also carry fixed thereto for rotation therewith and against longitudinal movement thereon, gears 25 constantly enmeshed with gears 26 for driving clutch shafts 27, which are splined within the gears 26 for rotation therewith, but free to reciprocate therein.

The upper ends of the shafts 27 carry internal cone clutch heads 28 adapted to seat within clutch recesses 29, of the members 24, the teeth of which are in constant mesh with gears 30 of spindles 31. The upper ends of the spindles are, of course, provided with chucks, or fixtures, generally indicated by the numeral 32.

For operating the clutch shafts 27 in timed synchronism with the movements of the carrier, the shafts are provided, at their lower ends, with adjustable nuts 33, which are adapted to receive the thrust of equalizer springs 34, thus to normally urge the clutch upwardly towards engaged position. When the clutch is disengaged, the thrust is taken against stop nuts 35 at the extreme ends of the shafts 27, which bear against collars 36 supported in flanges 37 of an operating hub 38, which is loosely mounted on the shaft 19 and which carries a cam follower 39, which is receivable within a cam path 40 of the member 18. Thus, by rotation of the shaft 19, with the member 18, the hub 38 will be raised, or lowered, to move therewith the shafts 27 to engage and disengage the clutch as at the desired times in the cycle of operation.

For slidably moving the slide gears 22, operating forks 41 are provided fixed upon sliding operating shafts 42, each having a spring 43, for normally urging the forks to the lowermost position. The lower end of the shafts 42 rests upon an operating collar 44 which carries a cam follower 45, adapted to ride upon a cam 46 carried by and rotatable with the shaft 19; the arrangement being such that upon rotation of the shaft, the cam 46 will engage the follower 45 to raise and lower the collar 44 and with it the gear forks 41 in accordance with the desired cycle of operation. Since the shaft 19 operates both the cam 46 and the member 18 together, synchronism between clutch movement and gear movement is insured.

Referring more particularly to Figure 2, it will be seen that a similar arrangement is provided for braking and locking the spindle at the loading station; the same operating mechanism being common to the work station and the loading station, the difference being that instead of the gear 22 being mounted upon the shaft 20 for driving the spindles, an equivalent gear 50 is mounted on a stationary stub shaft 51, thus to secure the gear against rotation; and, likewise, a clutch shaft 52, corresponding with the clutch shafts 27, is fixed against rotation.

In the cycle of operation, considering the shafts 20 to be rotating and with them the gears 22, 25, 26 and the shafts 27, the arrangement of the cam path 40 and the cam 46 is such that, at the end of the indexing of the carrier through the rotation of the shaft 19 with the indexing gear 16, the member 18 and the cam 46 will act to first raise the shafts 27, thus to establish frictional drive between the clutch heads 28 and the clutch seats 29, and thereby to drive the spindles 31 through this frictional contact. After a predetermined amount of such frictional rotation, preferably such that the speed of the spindles has reached a substantial synchronism with their respective shafts 20, a further rotation of the member 18 lowers the hub 38 and with it the shafts 27 and 52, thus releasing the clutch heads 28 from their seats 29, while, at the same time, the cam 46 is rotated whereby the collar 44 drops and the springs 43 force the forks 41 downward so as to bring about an enmeshment between the gears 22 and 50 respectively and the gear teeth of the element 24. The parts are adapted to remain in this position, as shown in Figures 1 and 2, until the beginning of the next indexing cycle. It will be noted that, as illustrated, the parts are in such a position that merely a slight clearance is had between the clutch surfaces. The cam path of the present operating embodiment of the invention is so designed in order to avoid time lost which would otherwise be required to bring the clutch head fully down before the end of the index cycle. Thus, at the beginning of the next index, the heads are dropped to their full downward position, as shown by the dotted lines. The lower position of the clutch members 28 is sufficiently down to permit the indexing of the gear 24 with the carrier. Before the index cycle has brought the new spindle into position, the gears 22 are raised by the action of the cam 46 to the position indicated by their dotted lines so as to be out of the way for the proper positioning of the gear 24 without clashing therewith, and the cycle then proceeds as outlined.

The same relative movement of the parts takes place with the gear 50 and the clutch shaft 52 at the loading station, as mentioned in the foregoing. During the index cycle, the gear 50 is raised on the stub 51 to its dotted line position and the clutch head of the shaft 52 is, after completion of the index, raised to apply a frictional brake to any rotary movement of the spindle and thereafter is moved downwardly, while the gear 50 drops into mesh for positively restraining the rotation.

In consideration of the foregoing specification, it will be seen that the device operates to provide an automatic frictional drive to bring the gears 30 and 22 into synchronized speed and, thereafter, to establish a positive drive therebetween, and, likewise, to provide, first, a frictional and then a positive lock for the spindle at the loading station. It will be understood, of course, that adjustments of the cycle may be made by variations in the cam path 40 and in the cam 46. It will be also understood that equivalents in the operating mechanism may be employed; and generally numerous changes and modifications may be used without departing from the spirit or scope of the invention as outlined in the appended claims.

Having set forth the nature of our invention, what we claim is:

1. In a machine tool having a working station and a loading station between which a work carrying spindle moves, the combination of means stationary with respect to the movement of the spindle between work station and loading station for driving the work spindle at the working station and similarly stationary means for braking the spindle at the loading station.

2. In a machine tool having a working station and a loading station between which a work carrying spindle moves, the combination of means stationary with respect to the movement of the spindle between work station and loading station for driving the work spindle at the working station and similarly stationary means for positively locking the work spindle against rotation at the loading station.

3. In a machine tool having a working station and a loading station between which a work carrying spindle moves, the combination of means stationary with respect to the movement of the spindle between work station and loading station for driving the work spindle at the working station and similarly stationary means for frictionally braking and positively locking the spindle against rotation at the loading station.

4. In a machine tool having a working station and a loading station between which a work carrying spindle moves, the combination of means stationary with respect to the movement of the spindle between work station and loading station for both frictionally and positively driving the work spindle at the working station and similarly stationary means for braking the spindle at the loading station.

5. In a machine tool having a working station and a loading station between which a work carrying spindle moves, the combination of means stationary with respect to the movement of the spindle between work station and loading station for both frictionally and positively driving the work spindle at the working station and similarly stationary means for positively locking the work spindle against rotation at the loading station.

6. In a machine tool having a working station and a loading station between which a work carrying spindle moves, the combination of means stationary with respect to the movement of the spindle between work station and loading station for both frictionally and positively driving the work spindle at the working station and similarly stationary means for frictionally braking and positively locking the spindle against rotation at the loading station.

7. In a machine tool having a working station and a loading station between which a work carrying spindle moves, the combination of means stationary with respect to the movement of the spindle between work station and loading station for driving the work spindle at the working station first frictionally, then positively and similarly stationary means for braking the spindle at the loading station.

8. In a machine tool having a working station and a loading station between which a work carrying spindle moves, the combination of means stationary with respect to the movement of the spindle between work station and loading station for driving the work spindle at the working station first frictionally, then positively and similarly stationary means for positively locking the work spindle against rotation at the loading station.

9. In a machine tool having a working station and a loading station between which a work carrying spindle moves, the combination of means stationary with respect to the movement of the spindle between work station and loading station for driving the work spindle at the working station first frictionally, then positively and similarly stationary means for frictionally braking and positively locking the spindle against rotation at the loading station.

10. In a machine tool having a working station and a loading station between which a work carrying spindle moves, the combination of means stationary with respect to the movement of the spindle between work station and loading station for driving the work spindle at the working station first frictionally, then positively, similarly stationary means for frictionally braking and positively locking the spindle against rotation at the loading station and a single means for engaging said frictional drive and brake and said positive drive and lock in timed relation.

11. In a machine tool, the combination of a spindle and drive shaft therefor, a frictional driving member for said spindle driven by said shaft and a separate positive driving member for said spindle driven by said shaft.

12. In a machine tool, the combination of a spindle and drive shaft therefor, a frictional driving member for said spindle driven by said shaft, a separate positive driving member for said spindle driven by said shaft and means for selectively establishing drive from said spindle for either of said means.

13. In a machine tool, the combination of a spindle and drive shaft therefor, a frictional driving member for said spindle driven by said shaft, a separate positive driving member for said spindle driven by said shaft and means for selectively establishing drive for said spindle for either of said means, said last mentioned means being arranged to successively actuate first the friction means and then the positive means.

14. In a machine tool a spindle, a spindle driving element arranged to rotate the spindle, said element having separate positive driving means and frictional driving means, and individual drives for each of said means.

15. In a machine tool a spindle, a spindle driving element arranged to rotate the spindle, said element having gear teeth for receiving positive drive and a frictional surface for receiving a frictional drive, and individual elements for delivering said positive and said frictional drive.

16. In a machine tool a spindle, a spindle driving element arranged to rotate the spindle, said element having gear teeth for receiving positive drive and a frictional surface for receiving a frictional drive, and individual elements for delivering said positive and said frictional drive, said individual means being movable to establish and break driving connections therefrom to said element.

17. In a machine tool a spindle, a spindle driving element arranged to rotate the spindle, said element having gear teeth for receiving positive drive and a frictional surface for receiving a frictional drive, individual elements for delivering said positive and said frictional drive, said individual means being movable to establish and break driving connections therefrom to said element and means for co-ordinately moving said individual means.

18. In a machine tool a driving element comprising a toothed member having a friction surface, said element being arranged to rotate the spindle upon its own rotation and to receive positive drive through its gear teeth and frictional drive from its friction surface.

19. In a machine tool driving assembly a spindle, a gear mounted thereon for rotation therewith, a spindle driving element, comprising a toothed member having a friction surface, meshing with the spindle gear and adapted to receive positive drive through its teeth and frictional drive from its friction surface.

20. In a machine tool spindle driving mechanism a spindle, a gear mounted thereon, a driving shaft, a gear slidable thereon and splined thereto, a gear fixed thereon, a spindle driving element including teeth meshing with the spindle gear and friction surface and means for moving the sliding gear into engagement with the teeth of the element to positively drive a spindle and friction drive driven by said fixed gear adapted to engage said friction surface.

21. In a machine tool a spindle brake including a spindle driving gear having a frictional surface, a braking element fixed against rotation and having a cooperative friction surface and means for establishing contact between said friction surfaces to brake the rotation of the spindles.

22. In a machine tool a spindle locking means including a spindle driving gear, a gear fixed against rotation and means for engaging said gears so as to restrain the spindle driving gear and thus the spindle against rotation.

23. In a machine tool a spindle brake and locking means, a spindle driving gear having a friction surface, a fixed element having a friction surface adapted to cooperate therewith, a gear fixed against rotation adapted to mesh with the spindle driving gear and means for moving the friction surface together to brake the spindle and means for establishing toothed enmeshment between the gears to positively lock the spindles.

24. In a machine tool a rotatable spindle carrier, a plurality of working stations to which the carrier successively carries the spindles, spindle drives at the working stations, a loading station, a spindle brake at the loading station, an indexing mechanism for periodically rotating the carrier and means operable by the indexing mechanism for operating the spindle drives and the brake.

25. In a machine tool a rotatable spindle carrier, a plurality of working stations to which the carrier successively carries the spindles, spindle drives at the working stations, a loading station, a spindle lock at the loading station, an indexing mechanism for periodically rotating the carrier and means operable by the indexing mechanism for operating the spindle drives and spindle lock.

26. In a machine tool a rotatable spindle carrier, a plurality of working stations to which the carrier successively carries the spindles, positive and frictional spindle drives at the working stations, a loading station, a spindle lock at the loading station, an indexing mechanism for periodically rotating the carrier and means operable by the indexing mechanism for operating the spindle drives and spindle lock.

27. In a machine tool a rotatable spindle carrier, a plurality of working stations to which the carrier successively carries the spindles, positive and frictional spindle drives at the working stations, a loading station, a spindle brake and a spindle lock at the loading station, an indexing mechanism for periodically rotating the carrier and means operable by the indexing mechanism for operating said spindles drives, brake and lock.

28. In a machine tool a rotatable spindle carrier, a plurality of working stations to which the carrier successively carries the spindles, positive and frictional spindle drives at the working stations, a loading station, a spindle brake and a spindle lock at the loading station, an indexing mechanism for periodically rotating the carrier and means operable by the indexing mechanism for operating said spindle drives, brake and lock, said means being operable to establish frictional drive and frictional braking prior to positive drive and positive locking.

29. In a machine tool a multiple spindle carrier, a spindle mounted therein, gears mounted on said spindle for driving the same, a plurality of working stations, a friction drive and a positive drive for each spindle at each working station, the former comprising a friction clutch and the latter a sliding gear, a loading station, a frictional brake and a positive lock for the spindle at the loading station, the former comprising a friction clutch and the latter a sliding gear, an indexing mechanism for periodically moving the carrier to bring the spindle successively to the working stations and to the loading station and cams operable by the indexing mechanism at the end of the indexing cycle to establish frictional drive for the spindles at the working station and frictional braking for the spindles at the loading station and thereafter to retract the frictional drives and brake and slide the gears to establish positive drive at the working stations and positive locking at the loading station.

30. In a machine tool, a plurality of individually driven shafts, an indexable carrier, a plurality of spindles carried thereby and means for driving each spindle successively from two or more of said shafts, said means including both a gear drive and a frictional drive for establishing driving connections between each shaft and each spindle.

31. In a machine tool, a plurality of individually driven shafts, an indexable carrier, a plurality of spindles carried thereby, means for driving each spindle successively from two or more of said shafts, said means including both a gear drive and a frictional drive for establishing driving connections between each shaft and each spindle and means operable with the indexing of said carrier to successively establish driving connections from said friction drive and said gear drive.

32. In a machine tool including a carrier, work spindles mounted in said carrier, means for periodically indexing said carrier and a plurality of driving means for the spindles fixed with respect to the indexing of said carrier and each comprising a conical friction element adapted to be moved away from the carrier to permit the same to index.

33. In a machine tool including a carrier, work spindles mounted in said carrier, means for periodically indexing said carrier, a plurality of driving means for the spindles fixed with respect to the indexing of said carrier and each comprising a conical friction element adapted to be moved away from the carrier to permit the same to index and a similar plurality of positive driving elements for each spindle.

34. In a machine tool including a carrier, work spindles mounted in said carrier, means for periodically indexing said carrier, a plurality of driving means for the spindles fixed with respect to the indexing of said carrier and each comprising a conical friction element adapted to be moved away from the carrier to permit the same to index, a similar plurality of positive driving elements for each spindle and means for first causing the friction drive to engage and bring the spindle up to speed and then causing the positive drive to engage.

EDWARD P. BULLARD.
ERNEST H. JOHNSON.